United States Patent
Chappell et al.

(10) Patent No.: US 6,672,953 B2
(45) Date of Patent: Jan. 6, 2004

(54) GAME SKINNER

(76) Inventors: Gary Lee Chappell, 2039 Old Sattler Rd., New Braunfels, TX (US) 78132-1818; Katherine Marie Chappell, 2039 Old Sattler Rd., New Braunfels, TX (US) 78132-1818

( * ) Notice: Subject to any disclaimer, the term of this patent is extended or adjusted under 35 U.S.C. 154(b) by 0 days.

(21) Appl. No.: 10/394,498

(22) Filed: Mar. 21, 2003

(65) Prior Publication Data

US 2003/0190878 A1 Oct. 9, 2003

Related U.S. Application Data

(60) Provisional application No. 60/370,303, filed on Apr. 4, 2002.

(51) Int. Cl.[7] .............................. A22B 1/00; A22B 7/00; A22C 18/00

(52) U.S. Cl. ...................................................... 452/187
(58) Field of Search .............................. 452/82, 83, 84

(56) References Cited

U.S. PATENT DOCUMENTS

| 4,806,063 A | * | 2/1989 | York | 452/187 |
| 4,903,372 A | * | 2/1990 | Jones | 452/187 |
| 5,791,858 A | * | 8/1998 | Sasser | 452/187 |

* cited by examiner

*Primary Examiner*—Charles T. Jordan
*Assistant Examiner*—Judith Nelson
(74) *Attorney, Agent, or Firm*—Weiner & Burt, P.C.; Irving M. Weiner; Pamela S. Burt

(57) ABSTRACT

A game skinner device having a winch and a roller deposed at opposite ends of a main support. The main support is adjustably secured to the hitch of a vehicle. The game skinner device does not support the weight of the game.

20 Claims, 2 Drawing Sheets

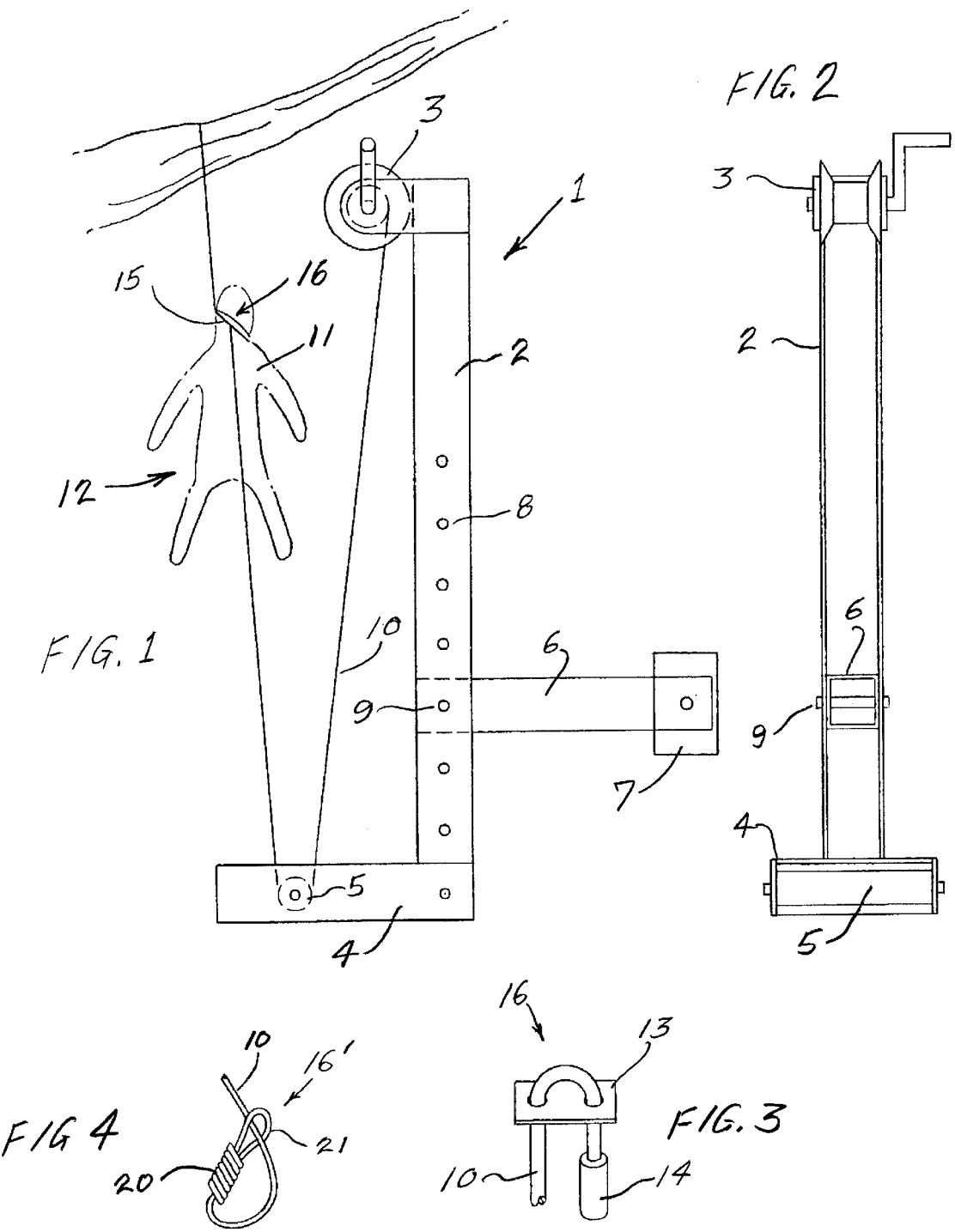

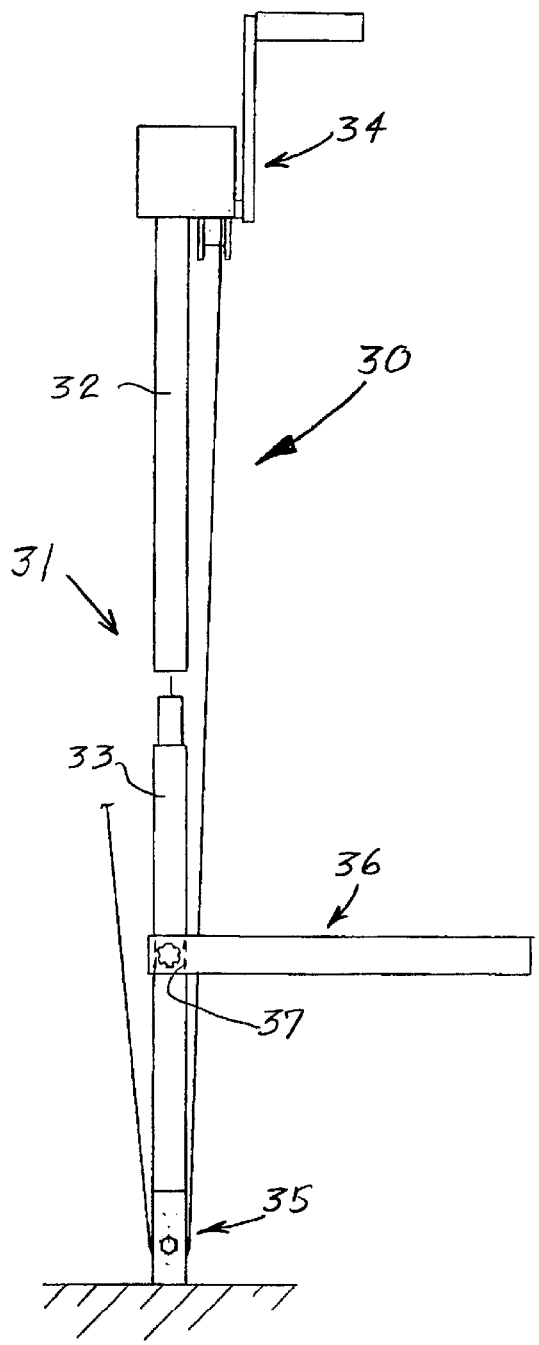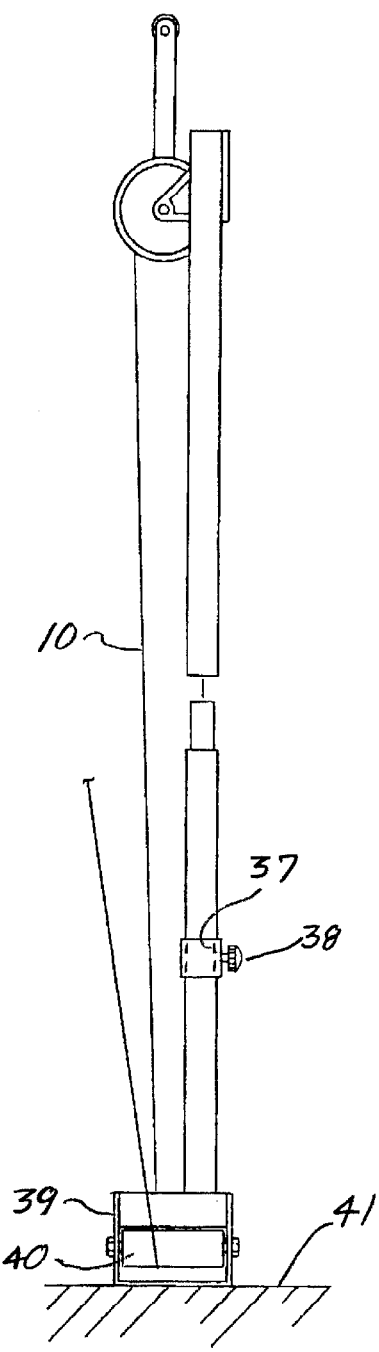

GAME SKINNER

The present patent application claims priority from and is a continuation-in-part of U.S. Provisional Patent Application Serial No. 60/370,303 filed Apr. 4, 2002.

The present invention relates generally to a device for skinning game.

In particular, the present invention relates to a lightweight and portable device for skinning game which may, for example, be mounted onto the receiving hitch of a pickup truck.

DESCRIPTION OF THE RELEVANT ART

The relevant art is exemplified by the following United States patents:

U.S. Pat. No. 4,806,063 issued in 1989 to York entitled "PORTABLE WILD GAME HOIST";

U.S. Pat. No. 4,903,372 issued in 1990 to Jones entitled "PORTABLE DEER POLE";

U.S. Pat. No. 5,791,858 issued in 1998 to Sasser entitled "VEHICLE MOUNTED GAME SKINNING DEVICE".

None of the conventional devices and techniques contemplates a lightweight and portable game skinning device which mounts into the receiving hitch of a pickup truck, is easily disassemblable for storage and transportation, and which does not support the weight of the game.

Indeed, a desideratum of the present invention is to avoid the animadversions of the conventional devices and techniques.

SUMMARY OF THE INVENTION

The present invention provides a game skinning device, comprising: winch assembly means; roller assembly means operably interconnected with said winch assembly means; main support means for supporting said winch assembly means and said roller assembly means; cable means operably interconnected with said winch assembly means, said roller assembly means, and a predetermined portion of game to be skinned; and hitch assembly means operatively, selectively and adjustably interconnectable with said main support means and with a hitch of a vehicle.

The present invention also provides a new and useful game skinning device which can be attached to the hitch on a vehicle. The device comprises a main support body member, an adjustable support member, a roller support, a roller, a slip noose, and a winch. The winch is rotatably supported at a first end of the main support body member, and the roller support member is affixed to a second end of the main support body member. The adjustable support member can be adjustably affixed to various locations along the main support body member. A cable runs from the winch, around the roller which is mounted on the roller support member, and from there to a novel slip noose mechanism which is affixed to the hide of the game to be removed.

It is a primary object of the present invention to provide a novel and useful game skinning device as described hereinabove, which device is lightweight and portable.

A further object of the present invention is to provide a game skinning device as described hereinabove, which is easily mountable to the receiving hitch on a vehicle, such as a pickup truck.

Yet another object of the present invention is to provide a game skinning device as described hereinabove wherein such device is easily disassemblable for storage and transportation purposes.

Another object of the present invention is to provide a game skinning device as described hereinabove, wherein such device does not support the weight of the game.

Yet a further object of the present invention is to provide a game skinning device which slides into the receiver hitch of a vehicle, assembles in about 45 seconds, and breaks down into three small pieces for storage.

The present invention possesses many advantages which will become more apparent to those persons skilled in this particular area of technology and to others after having been exposed to the following descriptions of some exemplary preferred embodiments of the present invention as set forth hereinbelow in conjunction with the accompanying drawings.

BRIEF DESCRIPTION OF THE DRAWINGS

FIG. 1 is a schematic drawing of a first embodiment of the present invention.

FIG. 2 illustrates an elevational sectional drawing showing the arrangements of the components taken from the left side of FIG. 1.

FIG. 3 is a perspective drawing of the slip noose device which is affixed to the end of the cable for attachment to the animal hide.

FIG. 4 is a perspective view of an alternate embodiment of the slip noose device which may be used with any embodiment of the present invention.

FIG. 5 illustrates a side elevation view of a second embodiment of the present invention.

FIG. 6 illustrates a front elevational view of the second embodiment depicted in FIG. 5.

DETAILED DESCRIPTION OF SOME PREFERRED EMBODIMENTS

FIGS. 1–3 of the drawings illustrate a first embodiment of the present invention in the form of a game skinning device 1.

The game skinning device 1 may include a main support body member 2. Preferably, but not necessarily, the main support body member 2 may take the form of a two-inch by two-inch by four-foot 14 gauge square metal tubing.

At the top end of the main support body member 2 there is rotatably attached thereto a winch 3, which may be either a hand winch or an electric winch.

At the bottom end of the main support body member 2 there is rotatably secured thereto roller support member 4. The roller support member 4 is provided with a roller 5 having bearings. Preferably, but not necessarily, the roller support member 4 make take the form of a two-inch by two-inch angle member supporting a one and one-half inch by ten-inch roller 5 with bearings.

There is provided an adjustable support member 6 for mechanical interconnection between the receiving hitch (not shown) of a vehicle and the main support body member 2. Preferably, but not necessarily, the adjustable support member 6 may take the form of a two-inch by two-inch 14 gauge square metal tubing which is welded to a two and one-half inch by two and one-half inch adjustable collar 7 for the receiver hitch (not shown).

The main support member 2 may be provided with a plurality of adjustment holes 8 to enable the adjustable support member 6 to be moved to the desired height and retained thereat by a pin member 9.

The game skinner device 1 in accordance with the first embodiment of the present invention is provided with a cable 10 which runs from the winch 3 and then around the roller 5, and is then attached to the skin 11 which is to be removed from the game 12.

The end of the cable 10 is provided with a slip noose device 16 which is best illustrated in FIG. 3. Preferably, but not necessarily, a one-eighth inch cable 10 passes through a one-eighth inch by one-half inch by one-inch long metal plate 13, and then passes gain through such plate 13. The end of the cable 10 is provided with a one-eighth inch stop member 14. The purpose of the slip noose device 16 is to go on the end of the cable 10 and to be secured to the animal hide or skin 11 to be removed.

With reference to FIG. 4, there is shown an alternate slip noose device 16' which includes a ferrule 20 and a loop 21 formed by the cable 10.

With reference to FIGS. 5 and 6, there is illustrated a game skinning device 30 in accordance with the second embodiment of the present invention.

The game skinning device 30 includes a main support member 31 which can be selectively disassembled into a first portion 32 and a second portion 33. A winch assembly 34 is affixed to one end of the first portion 32 of the main support member 31.

A roller assembly 35 is affixed to an end portion of the second portion 33 of the main support member 31.

Hitch assembly means 36 is provided for slipping into the hitch receiving portion (not shown) of a vehicle (not shown) at one end, and for adjustably securing the hitch assembly means 36 at its other end to the main support means 31 where desired. This is accomplished by an opening 37 in the hitch assembly 36 means which slides over the main support means 31, and is adjustably and selectively secured thereto by way of a set screw or set knob arrangement 38.

The roller assembly means 35 has a frame structure 39 for holding a roller 40 and for supporting such frame structure 39 against the terrain or some other external object or surface 41.

It should be noted that the cable 10 runs from the winch 34, around the roller 40 and up to the predetermined portion of the game 12 to be skinned, similar to that shown in the left portion of FIG. 1.

The device 1 or 30 in accordance with the present invention does not support the weight of the game 12. The game 12 should be hung in a suitable spot by either its head or feet. If the game 12 is hung by its head, the skin 11 should be pulled or teased away from the game 12 for several inches beneath the noose 15 holding the head of the game 12, and such skin should be bunched up and placed within and held by the noose device 16 or 16'.

After the skin or hide 11 has been attached to the slip noose device 16 or 16', the winch 3 or 34 is operated to remove the entire skin 11 from the game 12.

The game skinner device 1 or 30 in accordance with the present invention is a huge labor and time saver. For example, after hook up, the total skinning time is one to two minutes, as opposed to 20 to 30 minutes if done by hand. With the novel game skinner device 1 or 30 in accordance with the present invention, there is virtually no manual labor and up to 95% less hair is left on the meat of the animal.

The foregoing description is intended only to be illustrative of, but not limiting, of the present invention. The present invention is intended to cover various modifications and equivalent arrangements which come within the scope of the invention and the patent claims set forth hereinbelow.

There has been illustrated in the accompanying drawings and described hereinabove only two unique and novel preferred embodiments of the present invention, which can be constructed in several different configurations, sizes and shapes.

It should be understood that many changes, modifications, variations, and other uses and applications will become apparent to those persons skilled in this particular area of technology and to other persons after having been exposed to the present patent specification and accompanying drawings.

Any and all such changes, modifications, variations, and other uses and applications which do not depart from the spirit and scope of the present invention are therefore covered by and embraced within the present invention and the patent claims set forth hereinbelow.

What is claimed is:

1. A game skinning device, comprising:

winch assembly means;

roller assembly means operably interconnected with said winch assembly means;

main support means for supporting said winch assembly means and said roller assembly means;

cable means operably interconnected with said winch assembly means, said roller assembly means, and a predetermined portion of game to be skinned; and hitch assembly means operatively, selectively and adjustably interconnectable with said main support means and with a hitch of a vehicle.

2. A game skinning device according to claim 1, wherein; said roller assembly means is further supported by an external portion of the ground or the like.

3. A game skinning device according to claim 1, wherein:

said device breaks down into three small pieces for storage; and said three small pieces comprise: said winch assembly means and a first portion of said main support means; said roller assembly means and a second portion of said main support means; and said hitch assembly means.

4. A game skinning device according to claim 2, wherein:

said device breaks down into three small pieces for storage; and said three small pieces comprise: said winch assembly means and a first portion of said main support means; said roller assembly means and a second portion of said main support means; and said hitch assembly means.

5. A game skinning device according to claim 1, wherein:

said main support means comprises a first portion and a second portion which can be selectively separated from one another and interconnected with one another;

said winch assembly means is connected to said first portion of said main support means; and said roller assembly means is connected to said second portion of said main support means.

6. A game skinning device according to claim 2, wherein:

said main support means comprises a first portion and a second portion which can be selectively separated from one another and interconnected with one another;

said winch assembly means is connected to said first portion of said main support means; and said roller assembly means is connected to said second portion of said main support means.

7. A game skinning device according to claim 3, wherein:

said main support means comprises a first portion and a second portion which can be selectively separated from one another and interconnected with one another;

said winch assembly means is connected to said first portion of said main support means; and said roller assembly means is connected to said second portion of said main support means.

8. A game skinning device according to claim 4, wherein:

said main support means comprises a first portion and a second portion which can be selectively separated from one another and interconnected with one another;

said winch assembly means is connected to said first portion of said main support means; and said roller assembly means is connected to said second portion of said main support means.

9. A game skinning device according to claim 1, wherein:

when said game skinning device is in operative working position, said winch assembly means, said roller assembly means, and said main support means are aligned substantially vertically.

10. A game skinning device according to claim 2, wherein:

when said game skinning device is in operative working position, said winch assembly means, said roller assembly means, and said main support means are aligned substantially vertically.

11. A game skinning device according to claim 3, wherein:

when said game skinning device is in operative working position, said winch assembly means, said roller assembly means, and said main support means are aligned substantially vertically.

12. A game skinning device according to claim 4, wherein:

when said game skinning device is in operative working position, said winch assembly means, said roller assembly means, and said main support means are aligned substantially vertically.

13. A game skinning device according to claim 5, wherein:

when said game skinning device is in operative working position, said winch assembly means, said roller assembly means, and said main support means are aligned substantially vertically.

14. A game skinning device according to claim 6, wherein:

when said game skinning device is in operative working position, said winch assembly means, said roller assembly means, and said main support means are aligned substantially vertically.

15. A game skinning device according to claim 7, wherein:

when said game skinning device is in operative working position, said winch assembly means, said roller assembly means, and said main support means are aligned substantially vertically.

16. A game skinning device according to claim 8, wherein:

when said game skinning device is in operative working position, said winch assembly means, said roller assembly means, and said main support means are aligned substantially vertically.

17. A game skinning device according to claim 1, wherein:

said hitch assembly means is provided with connecting means for releasably and adjustably connecting said hitch assembly means along said main support means.

18. A game skinning device according to claim 2, wherein:

said hitch assembly means is provided with connecting means for releasably and adjustably connecting said hitch assembly means along said main support means.

19. A game skinning device according to claim 3, wherein:

said hitch assembly means is provided with connecting means for releasably and adjustably connecting said hitch assembly means along said main support means.

20. A game skinning device according to claim 16, wherein:

said hitch assembly means is provided with connecting means for releasably and adjustably connecting said hitch assembly means along said main support means.

* * * * *